(12) United States Patent
Corella (10) Patent No.: US 7,269,726 B1
(45) Date of Patent: Sep. 11, 2007

(54) LIGHTWEIGHT PUBLIC KEY INFRASTRUCTURE EMPLOYING UNSIGNED CERTIFICATES

(75) Inventor: Francisco Corella, Hayward, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/483,186

(22) Filed: Jan. 14, 2000

(51) Int. Cl.
*H04L 9/00* (2006.01)
*G06F 7/04* (2006.01)
*G06F 7/58* (2006.01)

(52) U.S. Cl. .................................. 713/156; 726/18
(58) Field of Classification Search ............... 713/169, 713/156; 726/10, 18
See application file for complete search history.

(56) References Cited

U.S. PATENT DOCUMENTS

| | | | |
|---|---|---|---|
| 4,324,645 A | | 4/1982 | Angevine et al. |
| 4,881,264 A | | 11/1989 | Merkle |
| 5,210,795 A | | 5/1993 | Lipner et al. |
| 5,224,163 A | * | 6/1993 | Gasser et al. .................. 380/30 |
| 5,276,901 A | | 1/1994 | Howell et al. |
| 5,420,927 A | | 5/1995 | Micali |
| 5,475,826 A | * | 12/1995 | Fischer .......................... 707/1 |
| 5,687,235 A | * | 11/1997 | Perlman et al. .............. 713/158 |
| 5,793,868 A | * | 8/1998 | Micali .......................... 380/28 |
| 5,796,841 A | | 8/1998 | Cordery et al. |
| 5,825,880 A | | 10/1998 | Sudia et al. |
| 5,850,442 A | | 12/1998 | Muftic |
| 5,850,444 A | | 12/1998 | Rune |
| 5,903,882 A | | 5/1999 | Asay et al. |
| 5,982,898 A | | 11/1999 | Hsu et al. |
| 5,996,076 A | | 11/1999 | Rowney et al. |
| 5,999,919 A | | 12/1999 | Jarecki et al. |
| 6,009,177 A | | 12/1999 | Sudia |
| 6,023,506 A | | 2/2000 | Ote et al. |
| 6,029,150 A | | 2/2000 | Kravitz |
| 6,044,462 A | | 3/2000 | Zubeldia et al. |
| 6,058,484 A | | 5/2000 | Chapman et al. |
| 6,092,201 A | | 7/2000 | Turnbull et al. |

(Continued)

FOREIGN PATENT DOCUMENTS

WO          WO98/21683          5/1998

(Continued)

OTHER PUBLICATIONS

Newton's Telecom Dictionary, 18th Edition, Harry Newton, Definition of Public Key Infrastructure, pp. 597,598.*

(Continued)

*Primary Examiner*—Gilberto Barron, Jr.
*Assistant Examiner*—Christopher Brown (57) ABSTRACT

A public key infrastructure (PKI) includes a subject, a verifier, and certificate authority that issues a first unsigned certificate to the subject that binds a public key of the subject to long-term identification information related to the subject and maintains a certificate database of unsigned certificates in which it stores the first unsigned certificate. The verifier maintains a hash table containing cryptographic hashes of valid unsigned certificates corresponding to the unsigned certificates stored in the certificate database and including a cryptographic hash of the first unsigned certificate. The subject presents the issued first unsigned certificate to the verifier for authentication and demonstrates that the subject has knowledge of a private key corresponding to the public key in the unsigned certificate.

28 Claims, 6 Drawing Sheets

U.S. PATENT DOCUMENTS

| | | | |
|---|---|---|---|
| 6,202,150 B1 | 3/2001 | Young et al. | |
| 6,202,151 B1 | 3/2001 | Musgrave et al. | |
| 6,212,636 B1* | 4/2001 | Boyle et al. | 713/168 |
| 6,226,743 B1 | 5/2001 | Naor et al. | |
| 6,230,266 B1 | 5/2001 | Perlman et al. | |
| 6,233,341 B1 | 5/2001 | Riggins | |
| 6,233,577 B1 | 5/2001 | Ramasubramani et al. | |
| 6,253,322 B1 | 6/2001 | Susaki et al. | |
| 6,263,446 B1* | 7/2001 | Kausik et al. | 713/201 |
| 6,282,295 B1 | 8/2001 | Young et al. | |
| 6,324,645 B1* | 11/2001 | Andrews et al. | 713/157 |
| 6,327,578 B1 | 12/2001 | Linehan | |
| 6,367,013 B1 | 4/2002 | Bisbee et al. | |
| 6,389,136 B1 | 5/2002 | Young et al. | |
| 6,393,563 B1* | 5/2002 | Maruyama et al. | 713/155 |
| 6,484,259 B1 | 11/2002 | Barlow | |
| 6,607,136 B1 | 8/2003 | Atsmon et al. | |
| 6,651,166 B1* | 11/2003 | Smith et al. | 713/150 |
| 6,754,829 B1 | 6/2004 | Butt et al. | |
| 2001/0037358 A1 | 11/2001 | Clubb et al. | |
| 2002/0143710 A1 | 10/2002 | Liu | |

FOREIGN PATENT DOCUMENTS

| | | |
|---|---|---|
| WO | WO99/19845 | 4/1999 |
| WO | WO99/35783 | 7/1999 |
| WO | WO 01/43344 | 6/2001 |

OTHER PUBLICATIONS

How PGP works, 1999.*
M. Boe et al., "TLS-Based Telnet Security," Internet Engineering Task Force, Internet Draft, pp. 1-20, (Updated Version Oct. 24, 2000, Previous Version Sep. 1998). <http://w w w.normos.org/ietf/draft/draft-ietf-tn3270e-telnet-tls-05.txt>.
D. Borman, "Telnet Authentication Option," Network Working Group, Request for Comments: 1416, pp. 1-7, (Feb. 1993). <http://w w w.csl.sony.co.jp/rfc/>.
M. Carpenter et al., "Securing FTP with TLS," Internet Engineering Task Force, Internet Draft, pp. 1-23, (Jan. 28, 1998). <http: // war.jgaa.com/ftp/draft/draft-murray-auth-ftp-ssl-03.txt>.
C. Ellison et al., "SPKI Certificate Theory," Network Working Group, Request for Comments: 2693, pp. 1-43, (Updated Version Sep. 1999, Previous Version Nov. 17, 1998). <http://w w w.csl.sony.co.jp/rfc/>.
S. Farrell, "TLS Extensions for AttributeCertificate Based Authorization," Transport Layer Security Working Group, Internet Engineering task Force, Internet Draft, pp. 1-11, (Aug. 20, 1998). < http://w w w.alternic.org/draft/draft-ietf-tls-attr-cert-01.txt>.
M. Horowitz et al., "FTP Security Extensions," Networking Working Group, Request Comments: 2228, pp. 1-27, (Oct. 1997). <http://w w w.csl.sony.co.jp/rfc/>.
R. Housley et al., "FTP Authentication Using DSA," CAT Working Group, Internet Engineering Task Force, Internet Draft, pp. 1-8, (Feb. 1998). <http://w w w.alternic.org/draft/draft/ietf-cat-ftpdsaauth-02.txt>.
R. Housley et al., "Telnet Authentication Using DSA," Secure Telnet Working Group, Internet Engineering Task Force, Internet Draft, 7 pages, (Jul. 1998). <http://w w w.alternic.org/draft/draft/housley-telnet-auth-dsa-02.txt.
J. Kohl et al., "The Kerberos Network Authentication Service (V5)," Network Working Group, Request for Comments: 1510, pp. 1-112, (Sep. 1993). <http://w w w.csl.sony.co.jp/rfc/>.
S. Micali, "Efficient Certificate Revocation," Massachusetts Institute of Technology, Laboratory for Computer Science, pp. 1-10 (Mar. 22, 1996).
M. Myers et al., "X.509 Internet Public Key Infrastructure Online Certificate Status Protocol-OCSP," Network Working Group, Request for Comments: 2560, pp. 1-22, (Jun. 1999). <http://w w w.csl.sony.co.jp/rfc/>.

M. Naor et al., "Certificate Revocation and Certificate Update," USENIX Association, Seventh USENIX Security Symposium, pp. 217-228, (Jan. 26-29, 1998).
C. New man "Telnet SASL Option," Network Working Group, Internet Engineering Task Force, Internet Draft, 6 pages, (Nov. 1998). <http://globecom.net/ietf/draft/draft-new man-telnet-sasl-01.html>.
E. Rescorla, "HTTP Over TLS," Internet Engineering Task Force, Internet Draft, pp. 1-6, (Sep. 1998). <http://w w w.alternic.org/draft/draft-ietf-tls-https-02.txt>.
RSA Security Inc., "RSA Keon Advanced PKI: A Security Architecture for Enabling E-Business," Solution White Paper, pp. 1-14, (1999). <http://w w w.rsasecurity.com/products/keon/whitepapers/adv pkiw p/rsa_keon_advanced_pki_w p.pdf>.
RSA Security Inc., "Security Services Provided by the RSA Keon Desktop v5.1," White Paper, pp. 1-8, (1999). <http://w w w.rsasecurity.com/products/keon/whitepapers/desktop/keon_desktop_w p.pdf>.
B. Tung et al., "Public Key Cryptography for Initial Authentication in Kerberos," Internet Engineering Task Force, Internet Draft, 21 pages (Expires May 15, 1999) <http://w w w.alternic.org/draft/draft-ietf-cat-kerberos-pk-init-07.txt>.
Web Page of the "Simple Public Key Infrastructure (spki)," Working Group, 2 pages, (Last Modified Jan. 16, 2001), <http://w w w.ietf.org/html.charters/spki-charter.html>.
Web Page of the "Transport Layer Security (tls)," Working Group, 2 pages, (Last Modified Mar. 30, 2001), <http://w w w.ietf.org/html.charters/tls-charters.html>.
International Telecommunications Union (ITU-T) Recommendation X.509, "Information Technology Open Systems Interconnection, The Directory: Authentication Framework," pp. i-81 (Jun. 1997).
R. Rivest, "Can We Eliminate Certificate Revocation Lists?," MIT Laboratory for Computer Science, pp. 178-183, (Feb. 1998). <http://theory.lcs.mit.edu/rivest>.
Menezes, "Handbook of Applied Cryptography," pp. 33, 37-39, 321-322, 559-560, 576-577, (1997).
PCT International Search Report for International Application No. PCT/US01/01520 mailed on Aug. 10, 2001 (8 pages).
Press, Jim, "Secure Transfer of Identity and Privilege Attributes in an Open Systems Environment," Computers & Security, vol. 10, No. 2., pp. 117-127, (Apr. 1991).
"SET Secure Electronic Transaction Specification," Book 1: Business Description, Version 1.0, XP-002203148, pp. i-72, (May 31, 1997).
A partial copy of European Search Report for Application No. EP 00 31 0771 mailed on Jul. 12, 2002 (4 pages).
Menezes et al "Handbook of Applied Cryptography" Hanbook of Applied Cryptography, CRC Press Series On Discete Mathematices And Its Applications, Boca Raton, Fl, CRC Press, US, 1997, XP002173298 ISBN: 0-8493-8523-7 * p. 39, line 1-line 38 * p. 559, line 7-p. 560, line 38 * p. 576, line 18—p. 577, line 37 *.
Stubblebine S: "Recent-Secure Authentication: Enforcing Revocation in Distributed Systems" /, 1995, pp. 1-12, XP002210000 * p. 3, right-hand column, line 13—p. 8, right-hand column, line 38 *.
Rivest R L: "Can We Eliminate Certificate Revocation Lists?" Financial Cryptography. International Conference, XX, XX, Feb. 1998, pp. 178-183, XP000997964 * the whole document *.
Foster, Ian. A Security Architecture for Computational Grids. ACM. San Francisco CA, 1998.
Wheeler, Lynn. Three Digital Signature Models . . . for x9.59. Nov. 28, 1997.
Stephen Cobb. Network World. Framingham: Jul. 7, 1997. vol. 14, Iss. 27; p. 53, 3 pgs.
Encrption Plus Folders. Encryption Plus Folders Enterprise. 2002.
Moeller, Michael. Digital IDs: offering expanded view of users: Verisign's next Digital certificates extend electronic ID's to include personal Data. PC Week. Zipp-Davis Publishing Co. Feb. 3, 1997.
Adams, C. et al., "Internet X.509 Public Key Infrastructure Certificate Management Protocols," Network Working Group, Request for Comments: 2510, pp. 1-72 (1999).

Stallings, William, "How to Protect the Company Jewels," CNN, Sci-Tech, Computing, Story Page, pp. 1-6 (Aug. 20, 1998) <http://cgi.cnn.com/tech/computing/9808/20/safejewels.>.

Wikipedia, the free encyclopedia, "Definition of Public Key Certificate," pp. 2, (Jul. 9, 2005) <http://en.wikipedia.org/wiki/digital_identity_certificate>.

Wikipedia, the free encyclopedia, "Definition of Root Certificate," pp. 1, (Jun. 3, 2005) <http://en.wikipedia.org/wiki/root_certificate>.

* cited by examiner

LIGHTWEIGHT PUBLIC KEY INFRASTRUCTURE EMPLOYING UNSIGNED CERTIFICATES

This patent application is related to the following Non-Provisional U.S. patent applications: Ser. No. 09/483,185, entitled "AUTHORIZATION INFRASTRUCTURE BASED ON PUBLIC KEY CRYPTOGRAPHY,"; Ser. No. 09/483,189, entitled "METHOD AND APPARATUS FOR PROVIDING FIELD CONFIDENTIALITY IN DIGITAL CERTIFICATES,"; and Ser. No. 09/483,356, entitled "LIGHTWEIGHT PUBLIC KEY INFRASTRUCTURE EMPLOYING DISPOSABLE CERTIFICATES,", and the following Provisional U.S. patent application Ser. No. 60/176,157, entitled "PUBLIC KEY VALIDATION SERVICE," which are all filed on even date herewith, are all assigned to the same assignee as the present application, and are all herein incorporated by reference.

THE FIELD OF THE INVENTION

The present invention relates to public key cryptosystems, and more particularly, to a public key infrastructure employing unsigned certificates for authentication.

BACKGROUND OF THE INVENTION

Public key cryptosystems are globally deployed on the World Wide Web, as well as on a growing number of enterprise networks, for establishment of secure communication channels. Every user in a public key cryptosystem has a pair of keys including a public key and a private key. The public key is disclosed to other users while the private key is kept secret. A public key cryptosystem typically has a primary designed use, such as for encryption, digital signature, or key agreement. Public key cryptosystems are also used for user authentication. For example, a user can authenticate itself to other users by demonstrating knowledge of its private key, which other users can verify using the corresponding public key.

In an application of a public key cryptosystem for authenticating a user, the public key must be securely associated with the identity of the user that owns the public key by authenticating the public key itself. Public key certificates are typically employed to authenticate the public key. A traditional public key certificate is a digital document, signed by a certificate authority, that binds a public key with one or more attributes that uniquely identify the owner of the public key. The public key certificate can be verified using the certificate authority's public key, which is assumed to be well known or is recursively certified by a higher authority. For example, in a corporation, a public key certificate can bind a public key to an employee number.

A public key infrastructure (PKI) refers to the collection of entities, data structures, and procedures used to authenticate public keys. A traditional PKI comprises a certificate authority, public key certificates, and procedures for managing and using the public key certificates.

One type of a user of a PKI owns the public key contained in a public key certificate and uses the certificate to demonstrate the user's identity. This type of user is referred to as the subject of the certificate or more generally as the subject. Another type of user relies on a public key certificate presented by another user to verify that the other user is the subject of the certificate and that the attributes contained in the certificate apply to the other user. This type of user that relies on the certificate is referred to as a verifier or relying party.

The association between a public key and an identity can become invalid because the attributes that define the identity no longer apply to the owner of the public key, or because the private key that corresponds to the public key has been compromised. A PKI typically employs two complementary techniques for dissociating a public key from an identity. In the first technique, each public key certificate has a validity period defined by an expiration date, which is a substantial period from the issue date, such as one year from the issue date. In the second technique, the certificate authority revokes a public key certificate if the public key certificate's binding becomes invalid before the expiration date. One way of revoking a public key certificate is by including a serial number of the public key certificate in a certificate revocation list (CRL), which is signed and issued by the certificate authority at known periodic intervals, such as every few hours or once a day. An entity that relies on a certificate is responsible for obtaining the latest version of the CRL and verifying that the serial number of the public key certificate is not on the list.

CRLs typically become quite long very quickly. When the CRLs become long, performance is severely impacted. First, CRL retrieval consumes large amounts of network bandwidth. Second, each application has a retrieve the CRL periodically, parse the CRL, and allocate storage for the CRL. Then, the application needs to carry out a linear search of the CRL for the public key certificate serial number when the application verifies each public key certificate. As a result, conventional PKIs do not scale beyond a few thousand users.

One solution proposed to alleviate the linear search problem is to partition CRLs. The serial number of the public key certificate determines where the CRL partition is located when the public key certificate is revoked. With partitioned CRLs, the application still has to retrieve and store the entire CRL or else the application needs to fetch a CRL partition in order to verify a certificate. Since certificate verification is a likely critical path, fetching a CRL partition impacts the time it takes to run the application.

An on-line certificate status protocol (OCSP) operates by permitting the verifier of the public key certificate to ask the certificate authority if the certificate is currently valid. The certificate authority responds with a signed statement. The OCSP allows CRLs to be avoided, but requires the verifier to query the certificate authority as part of the transaction that employs the public key certificates. The verifier querying the certificate authority increases the time it takes to perform the transaction. The OCSP scheme is highly vulnerable to a denial-of-service attack, where the attacker floods the certificate authority with queries. Responding to each query is computationally expensive, because each response requires a digital signature.

In a certificate status proofs scheme, the certificate authority maintains a data structure describing the set of valid and invalid certificates in the directory. For every public key certificate that has not yet expired, a short cryptographic proof can be extracted from the data structure of the certificate's current status (i.e., valid or invalid). A CRL can essentially be viewed as a cryptographic proof of invalidity for the public key certificates in the CRL, and proof of validity for those not in the CRL. The CRL, however, is not a short proof. The short cryptographic proof can be obtained by the verifier from the directory, or it can be obtained by the subject and presented to the verifier together with the public key certificate.

The Simple Public Key Infrastructure (SPKI) working group of the Internet Society and the Internet Engineering Task Force has proposed the possibility of employing short-lived certificates as a method of achieving fine-grain control over the validity interval of a certificate. See C. M. Ellison, B. Frantz, B. Lampson, R. Rivest, B. M. Thomas and T. Ylonen, SPKI Certificate Theory, Request for Comments 2560 of the Internet Engineering Task Force, September 1999. The SPKI certificate theory reference states that there are cases in which a short-lived certificate requires fewer signatures and less network traffic than various on-line test options. The user of a short-lived certificate always requires fewer signature verifications than the use of a certificate plus on-line test result.

Nevertheless, no practical method of issuing short-lived certificates has been proposed. Traditional certificates are issued off-line, as part of a process that includes subject registration, at the rate of one per year per user. By contrast, short-lived certificates would have to be issued on-line at the rate of at least one per day per user, and perhaps as often as one every few minutes for every user.

The term on-line and the term off-line have particular definitions in the context of a PKI. The term on-line herein refers to the day-to-day usage of public key certificates and key pairs for authentication. The term off-line herein refers to the more infrequent establishment or dissolution of public key bindings, which may result in the issuing or revocation of public key certificates. For example, the traditional certificate authority is off-line, issues CRLs off-line, and places the CRLs in a directory for on-line retrieval. The scheme involving certificate status proofs also makes use of off-line certificate authorities. The OCSP is the only scheme described above that employs an on-line certificate authority.

For reasons stated above and for other reasons presented in greater detail in the Description of the Preferred Embodiment section of the present specification, there is a need for an improved lightweight PKI that overcomes the above-described revocation problems and is more efficient and more scalable (in terms of numbers of certificates) than conventional PKIs.

SUMMARY OF THE INVENTION

The present invention provides a public key infrastructure (PKI) that includes a subject, a verifier, and certificate authority. The certificate authority issues a first unsigned certificate to the subject that binds a public key of the subject to long-term identification information related to the subject. The certificate authority maintains a certificate database of unsigned certificates in which it stores the first unsigned certificate. The verifier maintains a hash table containing cryptographic hashes of valid unsigned certificates corresponding to the unsigned certificates stored in the certificate database and including a cryptographic hash of the first unsigned certificate. The subject presents the issued first unsigned certificate to the verifier for authentication and demonstrates that the subject has knowledge of a private key corresponding to the public key in the unsigned certificate.

In one embodiment, the first unsigned certificate includes an expiration date/time. In one embodiment, the first unsigned certificate does not include an expiration date/time.

In one embodiment, the private key is stored in a secure storage medium accessible by the subject, such as a smart-card or a secure software wallet.

In one embodiment, the verifier computes the cryptographic hash of the first unsigned certificate with a collision-resistant hash function, such as a SHA-1 hash function or a MD5 hash function.

In one embodiment, the certificate authority and the verifier operate to revokes the first unsigned certificate when the binding of the subject's public key to the long-term identification information related to the subject becomes invalid. In one embodiment, the revocation is performed with the following protocol. The certificate authority retrieves first unsigned certificate from the certificate database and computes a cryptographic hash of the first unsigned certificate. The certificate authority sends a message to the verifier containing the cryptographic hash of the first unsigned certificate and requesting that the verifier remove the corresponding cryptographic hash of the first unsigned certificate from its hash table. The verifier removes the cryptographic hash of the first unsigned certificate from its hash table and notifies the certificate authority that it has removed the cryptographic hash of the first unsigned certificate from its hash table. The certificate authority collects the notification sent by the verifier.

In one embodiment, the revocation protocol includes the certificate authority marking the first unsigned certificate in the certificate database as being invalid, for auditing purposes. In an alternate embodiment, the revocation protocol includes the certificate authority deleting the first unsigned certificate from the certificate database.

The PKI according to the present invention is referred to as being a lightweight PKI because it is substantially simpler and more efficient than a conventional PKI that employs traditional long-term certificates. In contrast to the traditional long-term certificates employed by conventional PKIs, the unsigned certificates for authentication of the subject to the verifier according to the present invention are not signed, do not need an expiration date, and do not use CRLs. The PKI according to the present invention is also more scalable (in terms of numbers of certificates) than a conventional PKI.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
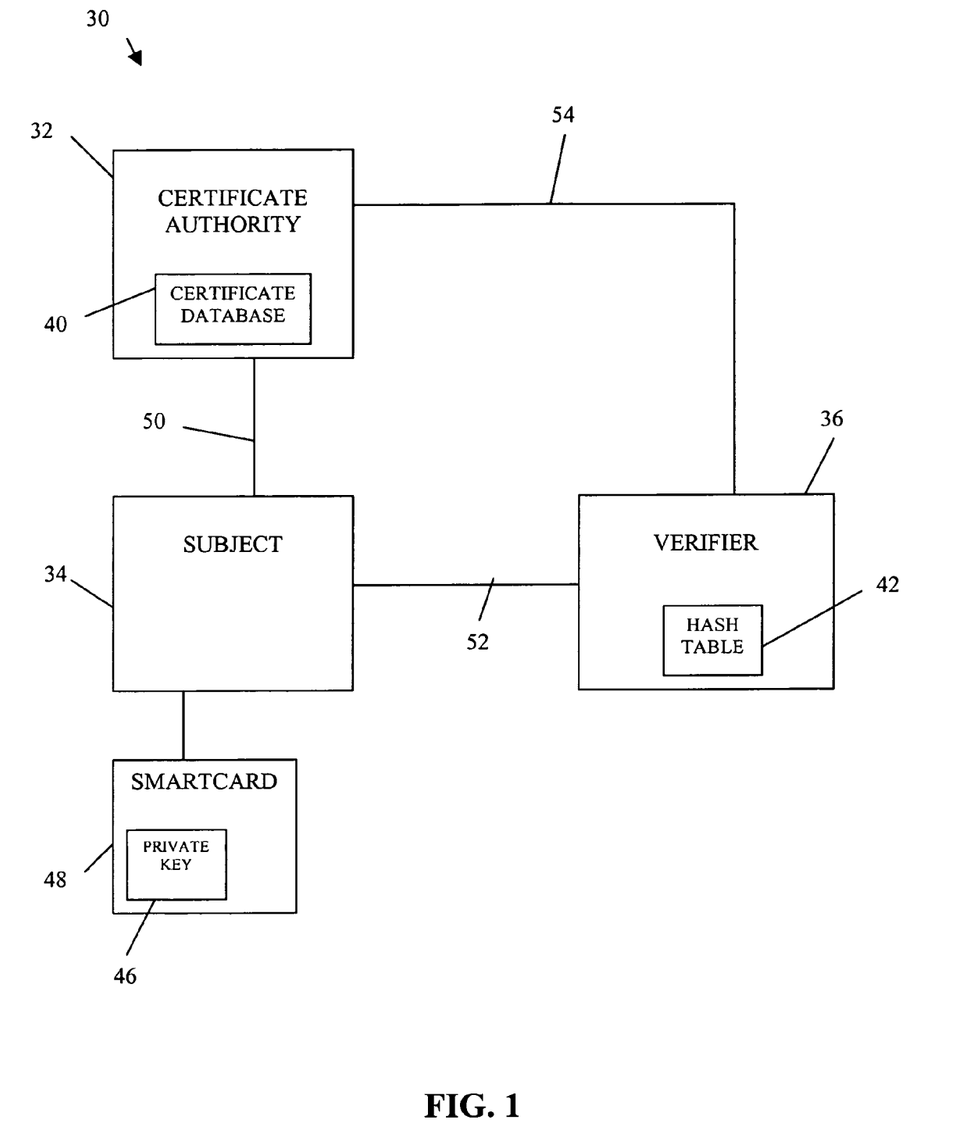
FIG. 1 is a block diagram of a light-weight public key infrastructure (PKI) according to the present invention employing unsigned certificates.

A light-weight public key infrastructure (PKI) according to the present invention is illustrated generally at 30 in FIG. 1. PKI 30 includes several main components which are each a software program. The main software program components of PKI 30 run on one or more computer systems. In one embodiment, each of the main software program components runs on its own computer system.

A certificate authority 32 issues unsigned certificates to one or more subjects, such as subject 34. Subject 34 is a user which owns a public key contained in the unsigned certificate and uses the unsigned certificate to demonstrate the subject's identity to one or more verifiers, such as verifier 36, by demonstrating that the subject has knowledge of a private key corresponding to the public key in the unsigned certificate. Verifier 36 is a user which relies on the unsigned certificate presented by subject 34 to verify that subject 34 is the subject of the unsigned certificate and that the attributes contained in the unsigned certificate apply to subject 34.

In some embodiments of PKI 30, the same user can play the role of subject 34 and verifier 36 in different situations. The present invention, however, is particularly beneficial in situations where subjects and verifiers form two distinct classes of users where the class of verifiers is relatively small (e.g., up to a few hundred verifiers) while the class of subjects can be very large (e.g., up to millions of subjects).

PKI 30 does not issue traditional long-term certificates, such as issued by conventional PKIs. Traditional long-term certificates are signed by a certificate authority and bind a public key of the subject with one or more attributes that uniquely identify the subject. Traditional long-term certificates typically have a validity period defined by an expiration date, which is a substantial period from the issue date, such as one year from the issue date. A conventional certificate authority needs to revoke a traditional long-term certificate if the public key certificate binding becomes invalid before the expiration date. As discussed in the Background of the Invention section of the present specification, a variety of methods have been used to revoke traditional long-term certificates, such as by using a certificate revocation list (CRL) or an on-line certificate status protocol (OCSP).

PKI 30 is referred to as being a lightweight PKI because it is substantially simpler and more efficient than a conventional PKI that employs traditional long-term certificates. In contrast to the traditional long-term certificates employed by conventional PKIs, the unsigned certificates for authentication of subject 34 to verifier 36 according to the present invention are not signed, do not need an expiration date, and do not use CRLs. The PKI 30 is also more scalable (in terms of numbers of certificates) than a conventional PKI.

Certificate authority 32 maintains a certificate database 40 containing unsigned certificates. Each unsigned certificate in certificate database 40 binds a public key of a subject, such as subject 34, to one or more attributes that uniquely identify the subject.

Verifier 36 maintains a hash table 42 containing cryptographic hashes of valid unsigned certificates. Each cryptographic hash in hash table 42 is computed from an unsigned certificate using an agreed upon collision-resistant hash function, such as SHA-1 or MD5. Hash table 42 is essentially a list of the currently valid unsigned certificates which is keyed by the cryptographic hash. Cryptographic hashes function well as keys for hash table 42, because cryptographic hashes behave statistically as random quantities.

Subject 34 has a private-key 46 stored in a secure storage medium 48, such as a smartcard or secure software wallet. Subject 34 also has a public key mathematically associated with private key 46 as specified by a public key cryptosystem. Subject 34 registers the public key corresponding to private key 46 with certificate authority 32 by sending the public key and one or more attributes that uniquely identify subject 34's identity to certificate authority 32 and demonstrating that the identification attributes apply to subject 34. Examples of such identification attributes include name, social security number, and employee number.

The components of PKI 30 are linked by one or more computer networks. A network connection 50 couples certificate authority 32 and subject 34. A network connection 52 couples subject 34 and verifier 36. A network connection 54 couples certificate authority 32 and verifier 36. Network connection 54 is preferably a secure network connection, such as a Secure Sockets Layer (SSL) connection, to properly protect communications between certificate authority 32 and verifier 36. In one embodiment, secure network connection 54 provides data integrity protection, including data origin authentication, and anti-replay protection.

Figure 2:
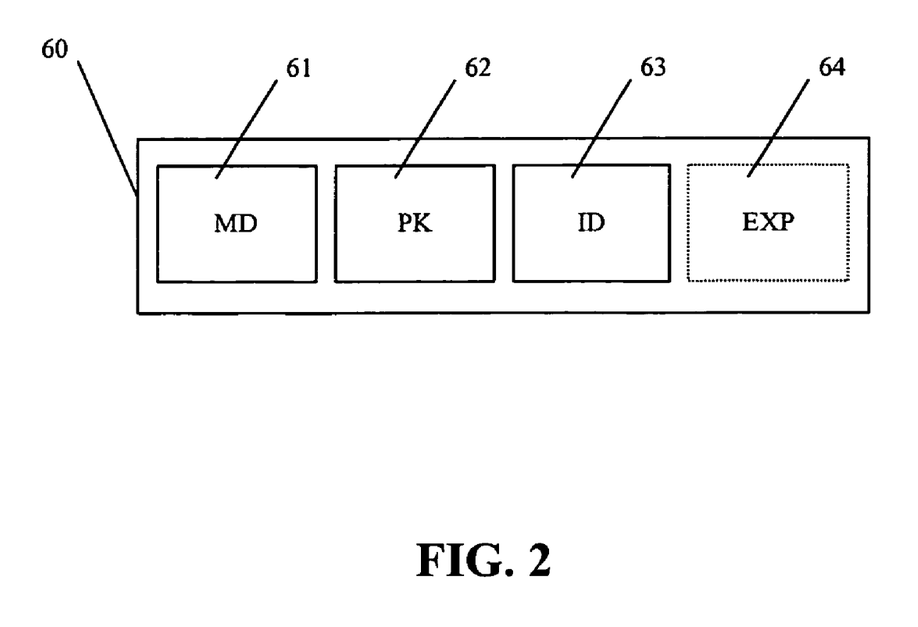
FIG. 2 is a diagram of an unsigned certificate issued from a certificate authority of the PKI of FIG. 1.

One embodiment of an unsigned certificate issued by certificate authority 32 is illustrated generally at 60 in FIG. 2. Unsigned certificate 60 includes a meta-data (MD) field 61 containing data about unsigned certificate 60 itself rather than data related to the subject. Examples of data stored in meta-data field 61 include serial number and issuer name. Unsigned certificate 60 includes a subject's public key (PK) 62. Unsigned certificate 60 includes long-term identification information (LTI) field 63 containing attributes uniquely identifying the subject, such as the subject's name, the subject's social security number, or the subject's employee number.

Unsigned certificate 60 optionally includes a long-term expiration (EXP) field 64 which contains a date/time of expiration for unsigned certificate 60. The expiration date/time contained in long-term expiration field 64 is useful for administrative purposes, but is not required for proper functioning of PKI 30. By contrast, in a conventional PKI, the expiration data is required to reduce the size of the CRL as revoked certificates reach their expiration dates.

Figure 3:
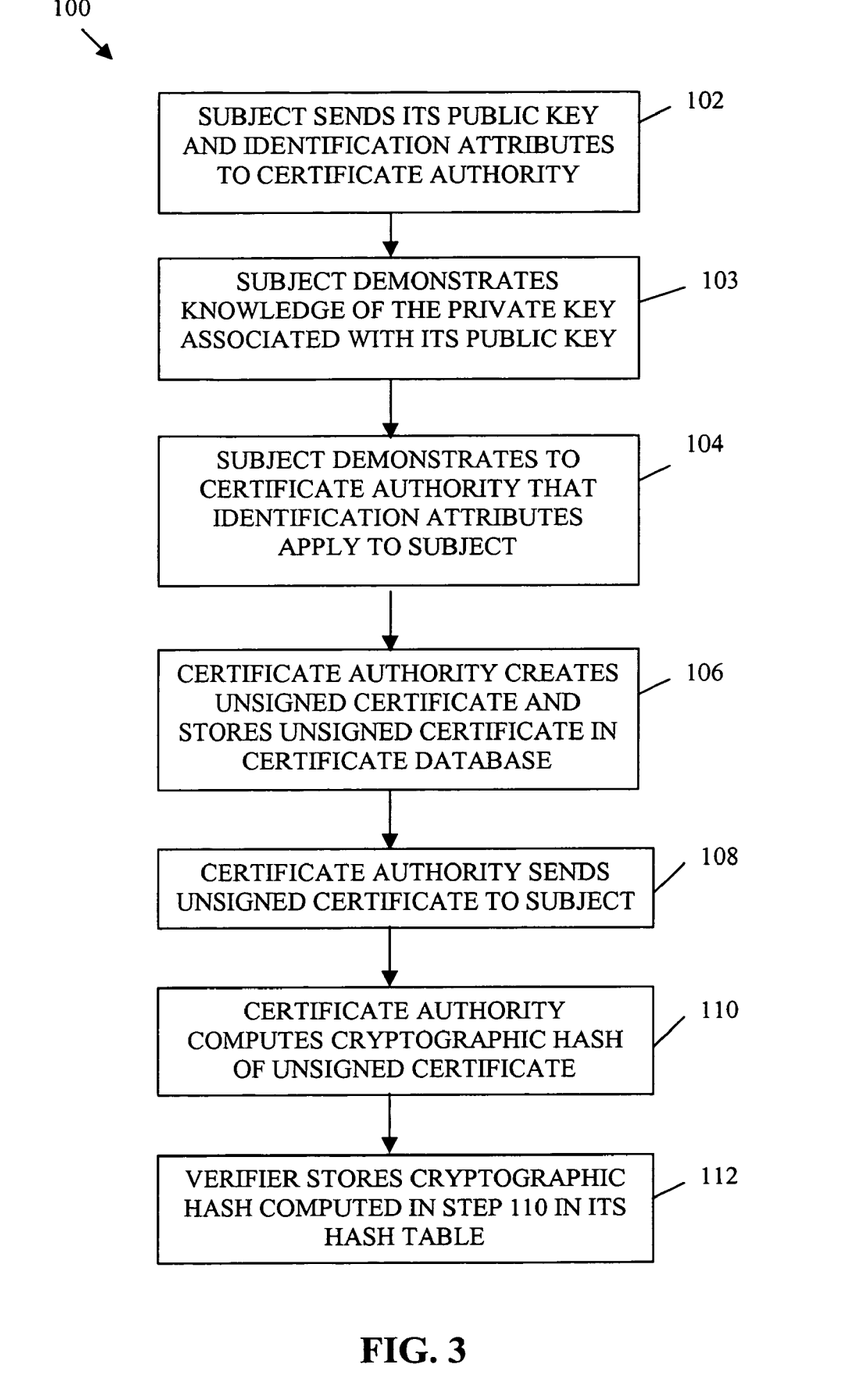
FIG. 3 is a flow diagram of a protocol for issuing an unsigned certificate from a certificate authority of the PKI of FIG. 1.

A protocol for issuing unsigned certificate 60 from certificate authority 32 is illustrated generally at 100 in FIG. 3. At step 102, subject 34 sends its public key and one or more attributes that uniquely identify subject 34 to certificate authority 32.

At step 103, subject 34 demonstrates knowledge of the private key 46 associated with the subject 34's public key. Step 103, is performed in a way that depends on the cryptosystem for which the private-public key pair has been generated by subject 34. For example, in a digital signature cryptosystem, subject 34 demonstrates knowledge of the private key 46 by using private key 46 to digitally sign a quantity derived from a random quantity generated by certificate authority 32. Certificate authority 32 then verifies this digital signature using subject 34's public key.

At step 104, subject 34 demonstrates to certificate authority 32, by out-of-band administrative means, that the identification attributes sent in step 102 apply to subject 34.

At step 106, certificate authority 32 creates unsigned certificate 60 and stores unsigned certificate 60 in certificate database 40. At step 108, certificate authority 32 sends unsigned certificate 60 to subject 34.

At step 110, certificate authority 32 computes a cryptographic hash of unsigned certificate 60 using an agreed upon collision-resistant hash function, such as SHA-1 or MD5. In step 110, certificate authority 32 sends the computed cryptographic hash of unsigned certificate 60 to verifier 36 over network connection 54, which provides data integrity protection, such as with an SSL connection. Secure network connection 54 prevents an attacker from tricking verifier 36 into accepting, and adding to hash table 43, a cryptographic hash of unsigned certificate 60 that has not been issued by certificate authority 32 or is no longer valid.

At step 112, verifier 36 stores the cryptographic hash of unsigned certificate 60 computed in step 110 in hash table 42.

Figure 4:
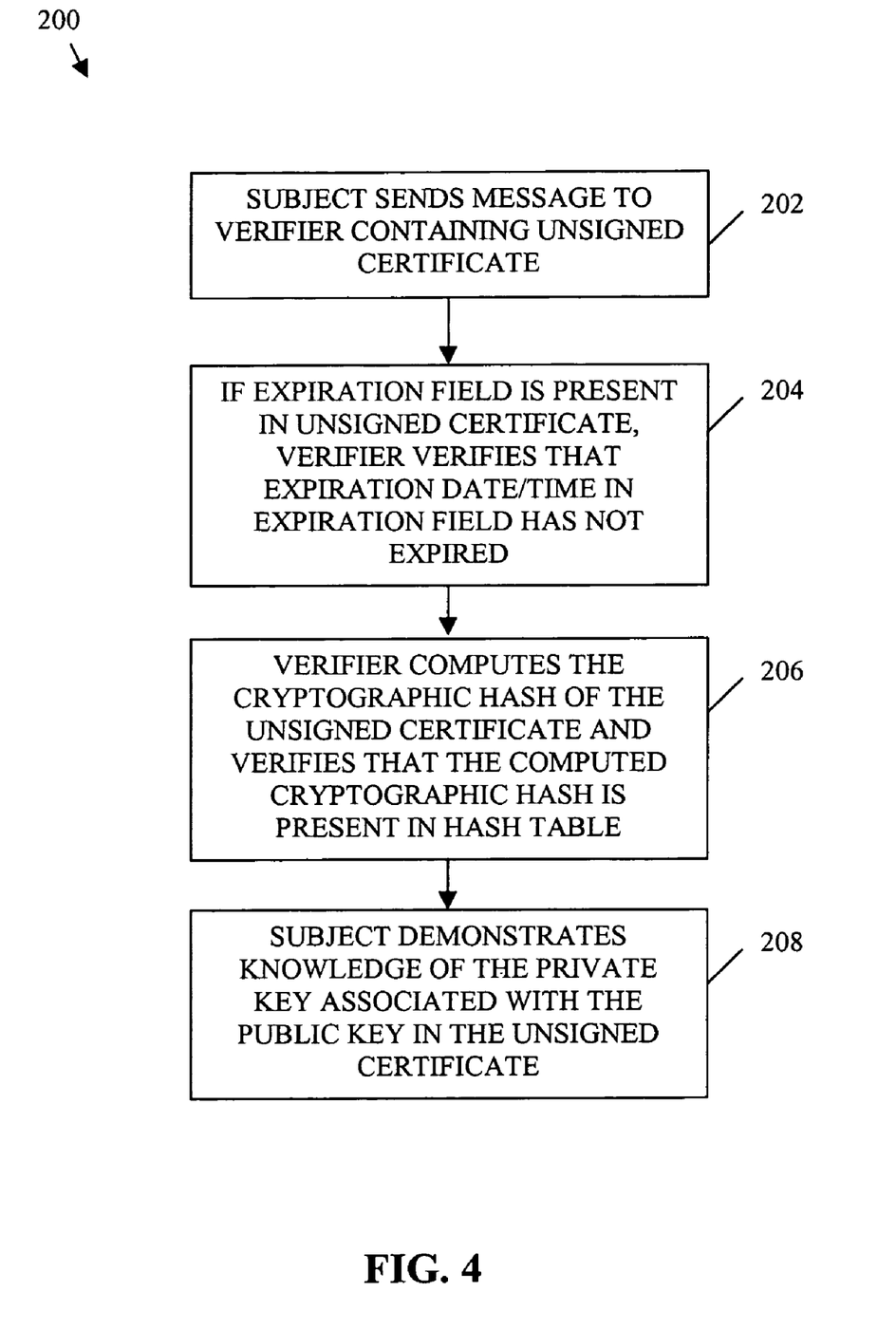
FIG. 4 is a flow diagram illustrating a protocol for a subject to demonstrate its identity to a verifier of the PKI of FIG. 1.

A protocol employed by subject 34 to demonstrate its identity to verifier 36 is illustrated generally at 200 in FIG. 4. At step 202, subject 34 sends a message to verifier 36 containing unsigned certificate 60.

At step 204, if a long-term expiration field 64 is present in unsigned certificate 60, verifier 36 verifies that the expiration date/time specified in long-term expiration field 64 has not been reached.

At step 206, verifier 36 computes a cryptographic hash of unsigned certificate 60 by the agreed upon collision-resistant hash function. In step 206, verifier 36 then verifies that the computed cryptographic hash is present in hash table 42. In step 206, verifier 36 performs a look-up of hash table 42 with an efficient and computationally inexpensive operation. Moreover, since unsigned certificate 60 is not signed, certificate authority 32 does not perform a computationally expensive signature operation to create unsigned certificate 60 and verifier 36 does not perform a computationally expensive signature verification operation as part of the validation of unsigned certificate 60.

At step 208, subject 34 demonstrates knowledge of the private key 46 associated with the public key 62 contained in unsigned certificate 60. Step 208 is performed in a way that depends on the cryptosystem for which the private/public key pair has been generated by subject 34. For example, in a digital signature cyptosystem, subject 34 demonstrates knowledge of the private key 46 by using private key 46 to digitally sign a quantity derived from a random quantity generated by verifier 36. Verifier 36 then verifies this digital signature using the public key 62 in unsigned certificate 60.

Figure 5:
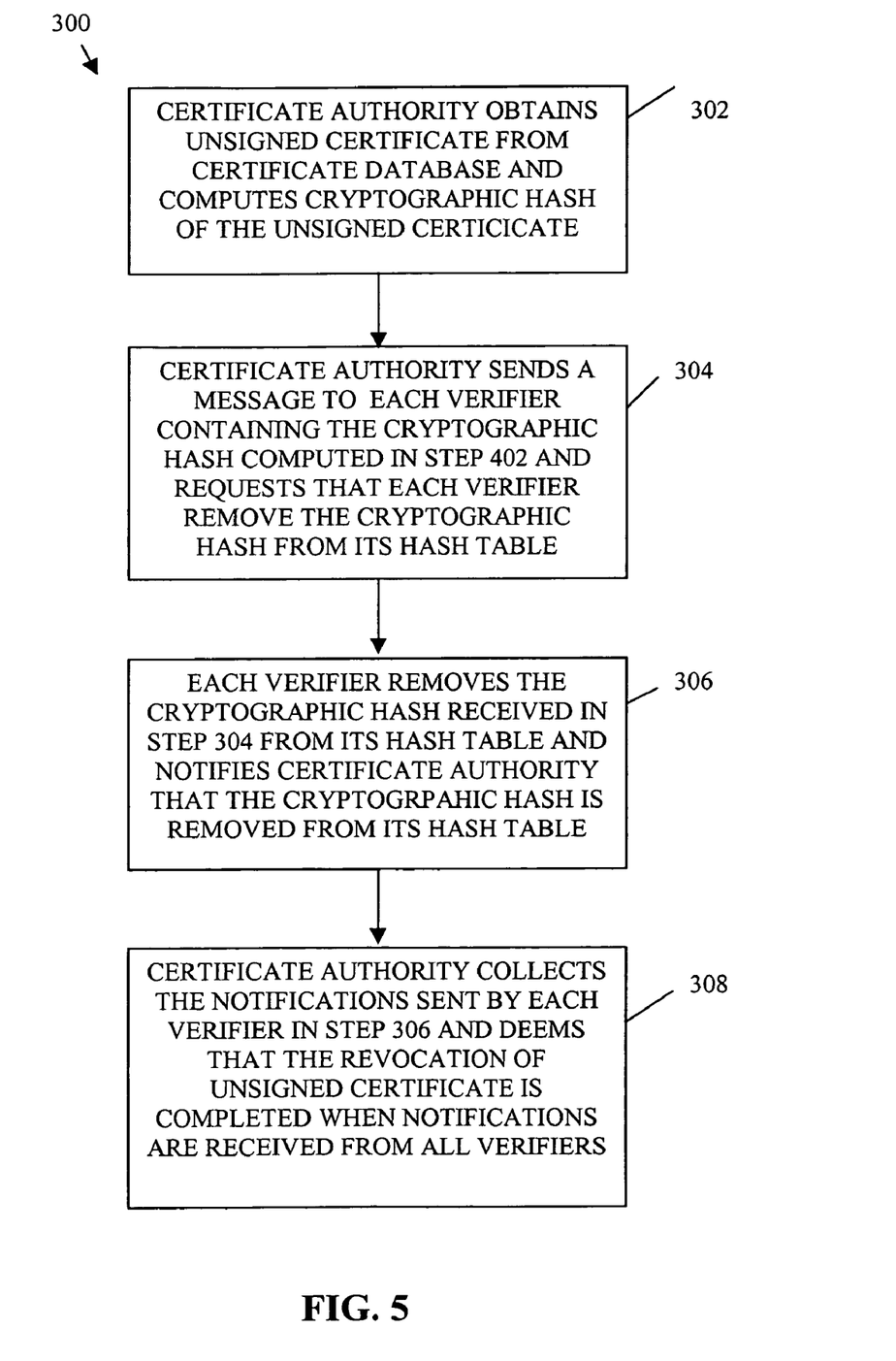
FIG. 5 is a flow diagram illustrating a protocol for a certificate authority to revoke an unsigned certificate for the PKI of FIG. 1.

A protocol for revoking unsigned certificate 60 is illustrated generally at 300 in FIG. 5. Protocol 300 is performed when subject 34's private key 46 is compromised or the identification attributes in long-term identification information field 63 no longer apply to subject 34, because in either case the binding of public key 62 to the identification attributes is invalid.

At step 302, certificate authority 32 retrieves unsigned certificate 60 from certificate database 40 and computes a cryptographic hash of unsigned certificate 60 using the agreed upon collision-resistant hash function. In one embodiment, certificate authority 32 marks unsigned certificate 60 in certificate database 40 as being invalid, for auditing purposes. In an alternative embodiment, where retention of unsigned certificate 60 in certificate database 40 is not required for auditing purposes, certificate authority 32 deletes unsigned certificate 60 from certificate database 40.

At step 304, certificate authority 32 sends a message to each verifier 36 containing the cryptographic hash of unsigned certificate 60 computed in step 302. The message sent in step 304 also requests that each verifier 36 remove the corresponding cryptographic hash of unsigned certificate 60 from its hash table 42.

At step 306, each verifier 36 removes the cryptographic hash of unsigned certificate 60 from its hash table 42 which corresponds to the cryptographic hash sent in the message from certificate authority 32 in step 304. In step 306, each verifier 36 notifies certificate authority 32 that it has removed the cryptographic hash of unsigned certificate 60 from its hash table 42. The notification performed in step 306 is sent to certificate authority 32 over secure network connection 54 to prevent an attacker from sending a false notification to certificate authority 32.

At step 308, certificate authority 32 collects the notifications sent by each verifier 36 in step 306. In step 308, certificate authority 32 deems that the revocation of unsigned certificate 60 is completed when notifications are received from all of the verifiers 36.

Once protocol 300 is completed, unsigned certificate 60 will not be accepted by any verifier 36 and will therefore become useless.

Protocol 300 for PKI 30 according to the present invention is practical only when there are a small number of verifiers 36 (e.g., up to a few hundred verifiers). If there are a small number of verifiers 36, it is likely that all of verifiers 36 will receive the request from certificate authority 32 in step 304 of protocol 300, remove the cryptographic hash in step 306, and return the acknowledgment (i.e., notification) in step 308. If one or two verifiers 36 fail to return an acknowledgement, an administrator of certificate authority 32 can investigate and manually correct the cause of the failure.

Figure 6:
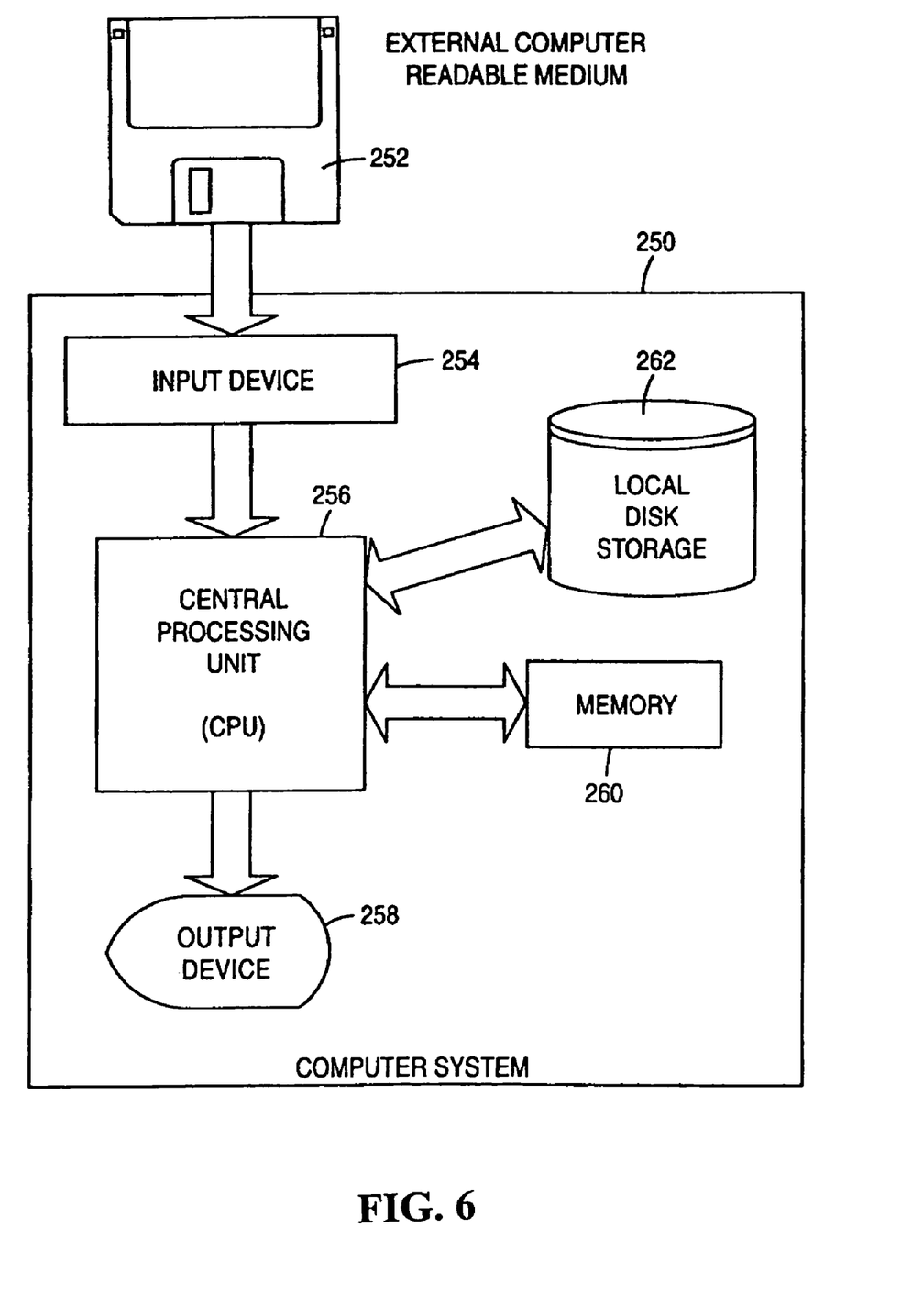
FIG. 6 is a block diagram of a computer system and a corresponding computer readable medium incorporating one or more main software program components of a PKI according to the present invention.

FIG. 6 illustrates one embodiment of a computer system 250 and an external computer readable medium 252 which can be employed according to the present invention to implement one or more of the main software program components of a light-weight PKI according to the present invention, such as PKI 30. Embodiments of external computer readable medium 252 include, but are not limited to: a CD-ROM, a floppy disk, and a disk cartridge. Any one of the main software program components of a light-weight PKI according to the present invention can be implemented in a variety of complied and interpreted computer languages. External computer readable medium 252 stores source code, object code, executable code, shell scripts and/or dynamic link libraries for any one of the main software program components of a light-weight PKI according to the present invention. An input device 254 reads external computer readable medium 252 and provides this data to computer system 250. Embodiments of input device 254 include but are not limited to: a CD-ROM reader, a floppy disk drive, and a data cartridge reader.

Computer system 250 includes a central processing unit 256 for executing any one of the main software program components of a light-weight PKI according to the present invention. Computer system 250 also includes local disk storage 262 for locally storing any one of the main software program components of a light-weight PKI according to the present invention before, during, and after execution. Any one of the main software program components of a light-weight PKI according to the present invention also utilizes memory 260 within the computer system during execution. Upon execution of any one of the main software program components of a light-weight PKI according to the present invention, output data is produced and directed to an output device 258. Embodiments of output device 258 include, but are not limited to: a computer display device, a printer, and/or a disk storage device.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A public key system comprising:
    a subject;
    a certificate authority issuing a first certificate to the subject, the first certificate including a public key of the subject, long-term identification information related to the subject, and meta-data related to the first certificate, wherein the first certificate is not signed by the certificate authority, the certificate authority maintaining a database of records representing issued certificates in which it stores a record representing the first certificate, wherein the issued certificates are each not signed by the certificate authority and are each valid until at least one of revoked by the certificate authority and expired; and
    a verifier maintaining a hash table containing cryptographic hashes of valid certificates corresponding to the records stored in the database and including a cryptographic hash of the first certificate, wherein the subject presents the issued first certificate to the verifier for authentication and demonstrates that the subject has knowledge of a private key corresponding to the public key in the first certificate.

2. The public key system of claim 1 wherein the first certificate includes an expiration date/time.

3. The public key system of claim 1 wherein the first certificate does not include an expiration date/time.

4. The public key system of claim 1 wherein the private key is stored in a smartcard accessible by the subject.

5. The public key system of claim 1 wherein the private key is stored in a secure software wallet accessible by the subject.

6. The public key system of claim 1 wherein the verifier computes the cryptographic hash of the first certificate with a collision-resistant hash function.

7. The public key system of claim 6 wherein the collision-resistant hash function is a SHA-1 hash function.

8. The public key system of claim 6 wherein the collision-resistant hash function is a MD5 hash function.

9. The public key system of claim 1 wherein the certificate authority and the verifier operate to revoke the first certificate when at least a portion of the long-term identification information related to the subject no longer applies to the subject.

10. The public key system of claim 1 wherein the certificate authority and the verifier perform a revocation protocol to revoke the first certificate when at least one of the private key is comprised and at least a portion of the long-term identification information related to the subject no longer applies to the subject, the revocation protocol including:
    the certificate authority retrieving a record representing the first certificate from the database and obtaining a cryptographic hash of the first certificate;
    the certificate authority sending a message to verifier containing the cryptographic hash of the first certificate and requesting that the verifier remove the corresponding cryptographic hash of the first certificate from its hash table;
    the verifier removing the cryptographic hash of the first certificate from its hash table and notifying the certificate authority that it has removed the cryptographic hash of the first certificate from its hash table; and
    the certificate authority collecting the notification sent by the verifier.

11. The public key system of claim 10 wherein the revocation protocol includes the certificate authority marking the record of the first certificate in the database as being invalid, for auditing purposes.

12. The public key system of claim 10 wherein the revocation protocol includes the certificate authority deleting the record representing the first certificate from the database.

13. A method of authenticating a subject to a verifier in a public key system, the method comprising the steps of:
    issuing a first certificate from a certificate authority to the subject, the first certificate including a public key of the subject, long-term identification information related to the subject, and meta-data related to the first certificate, wherein the first certificate is not signed by the certificate authority;
    maintaining, at the certificate authority, a database of records representing issued certificates that are each not singed by the certificate authority and are each valid until at least one of revoked by the certificate authority and expired;
    storing a record representing the first certificate in the database;
    maintaining, at the verifier, a hash table containing cryptographic hashes of valid certificates corresponding to the records stored in the database and including a cryptographic hash of the first certificate;
    presenting the issued first certificate from the subject to the verifier for authentication;
    demonstrating, by the subject, that the subject has knowledge of a private key corresponding to the public key in the first certificate.

14. The method of claim 13 wherein the first certificate includes an expiration date/time.

15. The method of claim 13 wherein the first certificate does not include an expiration date/time.

16. The method of claim 13 further comprising the step of:
    storing the private key in a smartcard accessible by the subject.

17. The method of claim 13 further comprising the step of:
    storing the private key in a secure software wallet accessible by the subject.

18. The method of claim 13 further comprising the step of:
    computing, by the verifier, the cryptographic hash of the first certificate with a collision-resistant hash function.

19. The method of claim 18 wherein the collision-resistant hash function is a SHA-1 hash function.

20. The method of claim 18 wherein the collision-resistant hash function is a MD5 hash function.

21. The method of claim 13 further comprising the step of:
  revoking the first certificate when at least a portion of the long-term identification information related to the subject no longer applies to the subject.

22. The method of claim 13 further comprising revoking the first certificate when at least one of the private key is comprised and at least a portion of the long-term identification information related to the subject no longer applies to the subject, the revoking including:
  retrieving the record representing the first certificate from the certificate database and obtaining a cryptographic hash of the first certificate;
  sending a message from certificate authority to verifier containing the cryptographic hash of the first certificate;
  requesting that the verifier remove the corresponding cryptographic hash of the first certificate from its hash table;
  removing the cryptographic hash of the first certificate from the hash table;
  notifying the certificate authority that the cryptographic hash of the first certificate is removed from the hash table; and
  collecting, at the certificate authority, the notification sent in the notifying step.

23. The method of claim 22 wherein the revoking step further includes:
  marking the record representing the first certificate in the database as being invalid, for auditing purposes.

24. The method of claim 22 wherein the revoking step further includes:
  deleting the record representing the first certificate from the database.

25. The public key system of claim 1 wherein the metadata includes at least one of a serial number of the first certificate and a name of the certificate authority.

26. The public key system of claim 1 wherein the long-term identification information related to the subject includes at least one of the subjects' name and a number identifying the subject.

27. The public key system of claim 1 wherein the certificate authority and the verifier operate to revoke the first certificate when the private key corresponding to the public key in the first certificate is compromised.

28. The method of claim 13 further comprising:
  revoking the first certificate when the private key corresponding to the public key in the first certificate is compromised.

* * * * *

UNITED STATES PATENT AND TRADEMARK OFFICE
CERTIFICATE OF CORRECTION

PATENT NO. : 7,269,726 B1 Page 1 of 1
APPLICATION NO. : 09/483186
DATED : September 11, 2007
INVENTOR(S) : Francisco Corella It is certified that error appears in the above-identified patent and that said Letters Patent is hereby corrected as shown below:

In column 2, line 24, after "has" delete "a" and insert -- to --, therefor.

In column 3, line 10, delete "user" and insert -- use --, therefor.

In column 6, line 44, delete "data" and insert -- date --, therefor.

In column 7, line 9, delete "43" and insert -- 42 --, therefor.

In column 8, line 45, delete "complied" and insert -- compiled --, therefor.

In column 10, line 36, in Claim 13, delete "singed" and insert -- signed --, therefor.

Signed and Sealed this

Fifteenth Day of July, 2008

JON W. DUDAS
*Director of the United States Patent and Trademark Office*